US008340570B2

(12) United States Patent
Nesbitt et al.

(10) Patent No.: US 8,340,570 B2
(45) Date of Patent: Dec. 25, 2012

(54) USING RADIO FREQUENCY TUNING TO CONTROL A PORTABLE AUDIO DEVICE

(75) Inventors: Pamela A. Nesbitt, Tampa, FL (US); Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/779,102

(22) Filed: May 13, 2010

(65) Prior Publication Data

US 2011/0282470 A1 Nov. 17, 2011

(51) Int. Cl.
*H04H 7/00* (2006.01)
(52) U.S. Cl. ............... 455/3.06; 455/41.2; 455/3.03; 455/140; 455/151.1
(58) Field of Classification Search .......... 455/3.01, 455/3.02, 3.06, 11.1, 41.2, 130, 140, 142, 455/150.1, 151.1, 151.2, 173.1, 178.1, 179.1, 455/180.1, 183.2, 187.1, 188.1, 552.1, 569.2; 725/81, 80, 131, 78; 381/123, 81; 700/94
See application file for complete search history.

(56) References Cited

U.S. PATENT DOCUMENTS

| 5,319,716 | A | 6/1994 | McGreevy |
| 6,707,924 | B1 * | 3/2004 | Okiebisu ................... 381/385 |
| 7,561,698 | B1 | 7/2009 | Pomerantz |
| 7,916,877 | B2 * | 3/2011 | Goldberg et al. .............. 381/123 |
| 2005/0160270 | A1 * | 7/2005 | Goldberg et al. .............. 713/176 |
| 2007/0010220 | A1 | 1/2007 | Lai |
| 2007/0049197 | A1 * | 3/2007 | Klein ............................ 455/41.2 |
| 2007/0133764 | A1 * | 6/2007 | Goldberg ................... 379/93.09 |
| 2007/0136769 | A1 * | 6/2007 | Goldberg et al. ................ 725/81 |
| 2007/0155312 | A1 * | 7/2007 | Goldberg et al. ............ 455/3.06 |
| 2007/0155313 | A1 * | 7/2007 | Goldberg et al. ............ 455/3.06 |
| 2007/0198112 | A1 | 8/2007 | Griffin, Jr. |
| 2008/0077882 | A1 | 3/2008 | Kramer et al. |
| 2008/0090540 | A1 | 4/2008 | Rofougaran |
| 2011/0295397 | A1 * | 12/2011 | Goldberg ........................ 700/94 |

FOREIGN PATENT DOCUMENTS

| CN | 1866998 A | 11/2006 |
| CN | 101072405 A | 11/2007 |
| JP | 2008017326 A | 1/2008 |

OTHER PUBLICATIONS

"Remote Control Car MP3 FM Transmitter Modulator 12 v Wireless", Focalprice.com, retrieved Oct. 6, 2008, 1 page.
"car mp3 player/wireless mp3 FM modulator", TradeMe.co.nz, 1 page, retrieved Oct. 6, 2008.

* cited by examiner

*Primary Examiner* — Tan Trinh
(74) *Attorney, Agent, or Firm* — Yee & Associates, P.C.; David A. Mims, Jr.

(57) ABSTRACT

A method for controlling a portable audio device using radio frequency tuning is provided. A radio signal transmitter device communicatively coupled to the portable audio device transmits an audio signal of an audio file on a first radio frequency channel, a forward control signal on a second radio frequency channel, and a backward control signal on a third radio frequency channel to a radio signal receiver device. The portable audio device determines whether an audio output of the forward control signal is received by an audio receiver device. In response to determining that the portable audio device did receive the audio output of the forward control signal using the audio receiver device, the portable audio device plays a next audio file in a play list.

20 Claims, 8 Drawing Sheets

USING RADIO FREQUENCY TUNING TO CONTROL A PORTABLE AUDIO DEVICE

BACKGROUND

1. Field

The disclosure relates generally to an improved data processing system and more specifically to a computer implemented method, apparatus, and computer usable program code for controlling a portable audio device using radio frequency tuning.

2. Description of the Related Art

Today, portable audio players, such as an MP3 player or an iPOD®, have found increased popularity among people because of their portability and capability to store a large number of songs and other audio files. iPOD® is a trademark of Apple Inc., registered in the United States and other countries. A user accesses a song or other audio file on a portable audio player by manipulating one or more small controls on the audio player, while looking at the display screen to make the desired selection. However, if the user is a driver of a vehicle, the driver's attention is now diverted away from driving and toward the audio player to manipulate the small controls, which creates an unsafe driving condition.

SUMMARY

According to one embodiment of the present invention, a portable audio device is controlled using radio frequency tuning. A radio signal transmitter device communicatively coupled to the portable audio device transmits an audio signal of an audio file on a first radio frequency channel, a forward control signal on a second radio frequency channel, and a backward control signal on a third radio frequency channel to a radio signal receiver device. The portable audio device determines whether an audio output of the forward control signal is received by an audio receiver device. In response to determining that the portable audio device did receive the audio output of the forward control signal using the audio receiver device, the portable audio device plays a next audio file in a play list.

DETAILED DESCRIPTION

Figure 1:
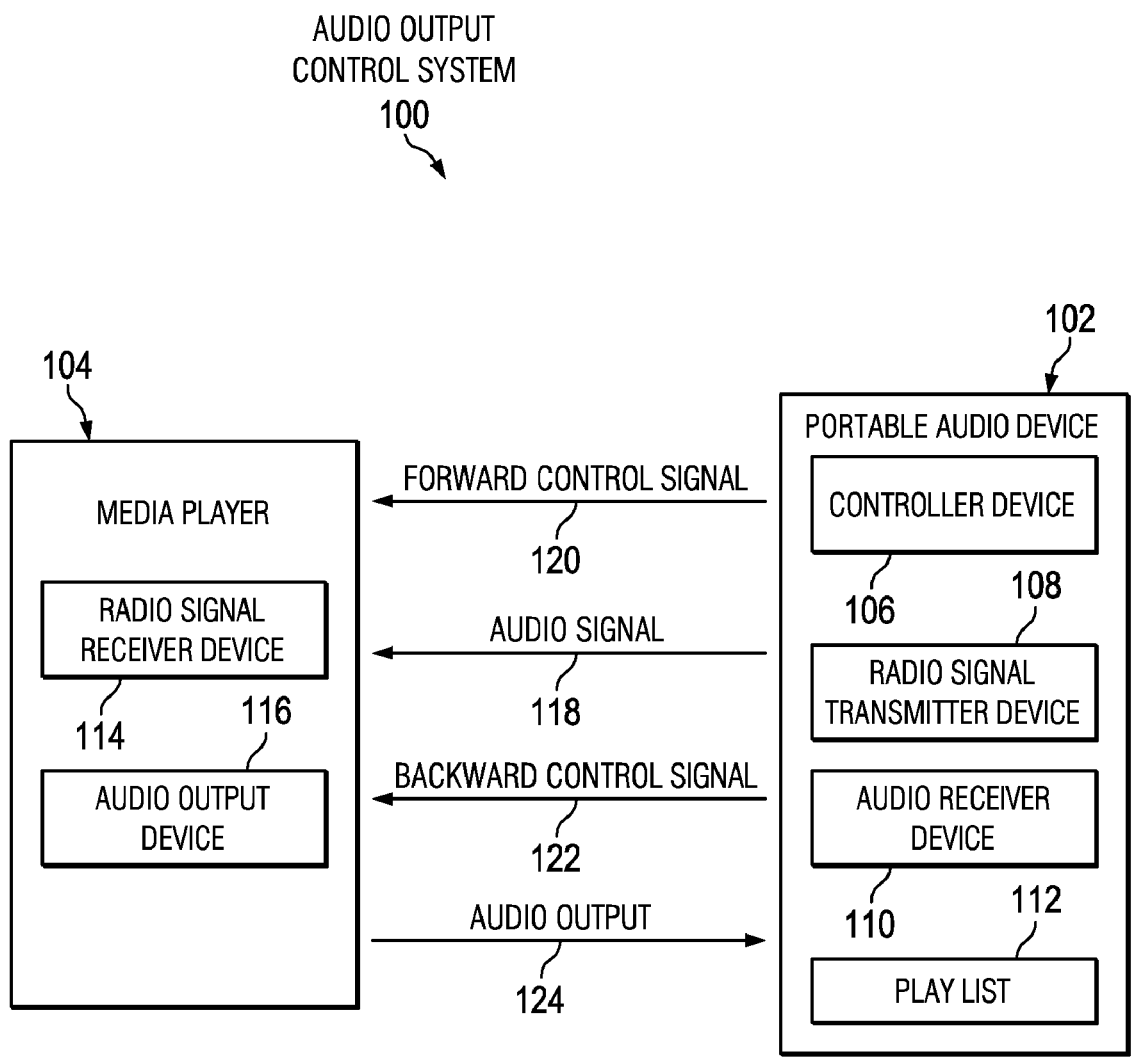
FIG. 1 is a diagram of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Illustrative embodiments provide a computer implemented method, apparatus, and computer usable program code for controlling a portable audio device using radio frequency tuning. Illustrative embodiments provide a portable audio player that transmits three different signals on three different radio frequency channels using a built-in radio transmitter. The portable audio player is a hand held electronic device that is capable of storing and playing audio files containing songs, music, and/or spoken word content. The portable audio player may, for example, be an MP3 player or an iPOD®. The radio transmitter may, for example, be an FM, AM, XM, or other type of radio signal transmitter, which converts the audio files into radio frequency signals. Radio frequency signals are electromagnetic waves within the range of radio frequencies used for communications. Then, the radio transmitter wirelessly conveys the radio frequency signals of the audio files to a remote radio signal receiver located on, for example, a radio system, a television system, a stereo system, a computer system, or any other system capable of receiving radio frequency signals. The transmission of the audio signal of the audio files may be analog or digital.

The portable audio player may include a control that allows a user to select the radio transmission frequency on which the radio transmitter transmits the audio signal of the audio files and a display screen that displays the selected transmission frequency to the user. Alternatively, the portable audio player may include a component that automatically sets the radio frequency on the portable audio player to a location where local radio stations are not broadcasting on that particular radio frequency. The user then tunes the radio signal receiver to the selected radio frequency channel that the radio transmitter is transmitting the audio signal of the audio files on. Alternatively, the portable audio player may include a component that directs the radio signal receiver to automatically tune to the appropriate radio frequency channel to receive the audio signal of the audio files transmitted from the portable audio player using the radio transmitter. Now, the radio signal receiver is able to receive and output the audio signal of the audio file currently being played by the portable audio player.

The three different radio frequency channels including the three different signals include an upper radio frequency channel, a middle frequency radio channel, and a lower radio frequency channel. The upper, middle, and lower radio frequency channels are located within a narrow band of radio frequencies. For example, the middle radio frequency channel is initially set at (n) MHz. The middle radio frequency channel may be initially set by a user manually, by the portable audio player automatically, or by the portable audio player using a default radio frequency setting. After the middle radio frequency channel is set, the portable audio player then sets the upper radio frequency channel at, for example, (n+0.2) MHz and the lower radio frequency channel at (n−0.2) MHz. However, it should be noted that illustrative embodiments are not restricted to separating the upper and lower radio frequency channels from the middle radio frequency channel by 0.2 MHz. In other words, illustrative embodiments may increase or decrease the amount of MHz separation between each of the three radio frequency channels. In addition, illustrative embodiments may utilize a kHz value instead of a MHz value for the amount of separation between the three channels.

The middle radio frequency channel includes the audio signal of the song or audio file that is currently being played on the portable audio player. The upper radio frequency channel and the lower radio frequency channel both include a computer generated control signal that is used to control which audio file within a play list is to be played by the portable audio player. The upper radio frequency channel includes a skip forward control signal to cause the portable audio player to advance to the next audio file in the play list. The lower radio frequency channel includes a skip backward control signal to cause the portable audio player to retreat to the previous audio file in the play list.

As an illustrative example, the lower radio frequency channel is set to 100.5 MHz with a backward control signal generated at 440 Hz. The middle radio frequency channel is set to 100.7 MHz with the audio signal of track #5 of Songs for Kids audio file. The upper radio frequency channel is set to 100.9 MHz with a forward control signal generated at 880 Hz. It should be noted that illustrative embodiments use simple sinusoid sounds for the forward and backward control signals for clarity. However, illustrative embodiments may utilize less annoying sounds to users as long as the sounds are distinguishable enough to be picked up by an audio receiver, such as a microphone, located on the portable audio player. Further, illustrative embodiments may utilize sounds that are inaudible to users, but are still capable of being picked up by the audio receiver on the portable audio player.

During normal use, the user tunes the radio signal receiver to the middle radio frequency channel, which in this example is 100.7 MHz, so that the radio signal receiver may receive and output the music of track #5 of the Songs for Kids audio file. To skip ahead to the next song in the play list, the user tunes the radio signal receiver to the upper radio frequency channel, which in this example is 100.9 MHz. The audio receiver on the portable audio player now receives the computer generated forward control signal, which in this example is 880 Hz transmitted on channel 100.9 MHz.

Receiving this forward control signal prompts the portable audio player to perform two tasks. First, the portable audio player skips ahead to the next audio track in the play list of Songs for Kids. Second, the portable audio player increases or increments the frequencies of each of the radio frequency channels by a predetermined amount, such as, for example, 0.2 MHz. Now, the radio transmitter on the portable audio player transmits the backward control signal of 440 Hz on lower radio frequency channel 100.7 MHz, the audio signal of track #6 of the Songs for Kids audio file on middle radio frequency channel 100.9 MHz, and the forward control signal of 880 Hz on upper radio frequency channel 101.1 MHz.

To skip back to the previous song in the play list, the user tunes the radio signal receiver to the lower radio frequency channel, which in this example is now channel 100.7 MHz outputting the 440 Hz backward control signal. Receiving this backward control signal prompts the portable audio player to skip back to the previous audio track and decrease or decrement the frequencies of each of the radio frequency channels by the same predetermined amount, which in this example is 0.2 MHz. Consequently, the radio transmitter on the portable audio player now transmits the backward control signal of 440 Hz on lower radio frequency channel 100.5 MHz, the audio signal of track #5 of the Songs for Kids audio file on middle radio frequency channel 100.7 MHz, and the forward control signal of 880 Hz on upper radio frequency channel 100.9 MHz.

Furthermore, the portable audio player may be equipped with wireless network technology. The wireless network technology creates a communication network, such as a wireless local area network (LAN) or personal area network (PAN), for wirelessly sending and receiving data between devices. The wireless network technology may, for example, be Bluetooth, wireless fidelity (WiFi), infrared, ultra-wide band (UWB), or ZigBee technology. For example, if the portable audio player is equipped with the wireless network technology, then in an alternative embodiment, the radio transmitter may be a separate, dedicated device, or may be included in another data processing system, such as a cellular telephone. In this alternative embodiment, the remote radio transmitter receives the audio signal of the audio file currently being played by the portable audio device via the wireless network technology.

Then, the remote radio transmitter transmits the three different signals on the three different radio frequency channels to the radio signal receiver. Subsequently, the remote radio transmitter receives an audible audio output produced by the radio signal receiver using, for example, a built-in microphone. Then, the remote radio transmitter directs the portable audio player to move forward or backward in the play list using the wireless network technology based on the received audible audio output.

Figure 2:
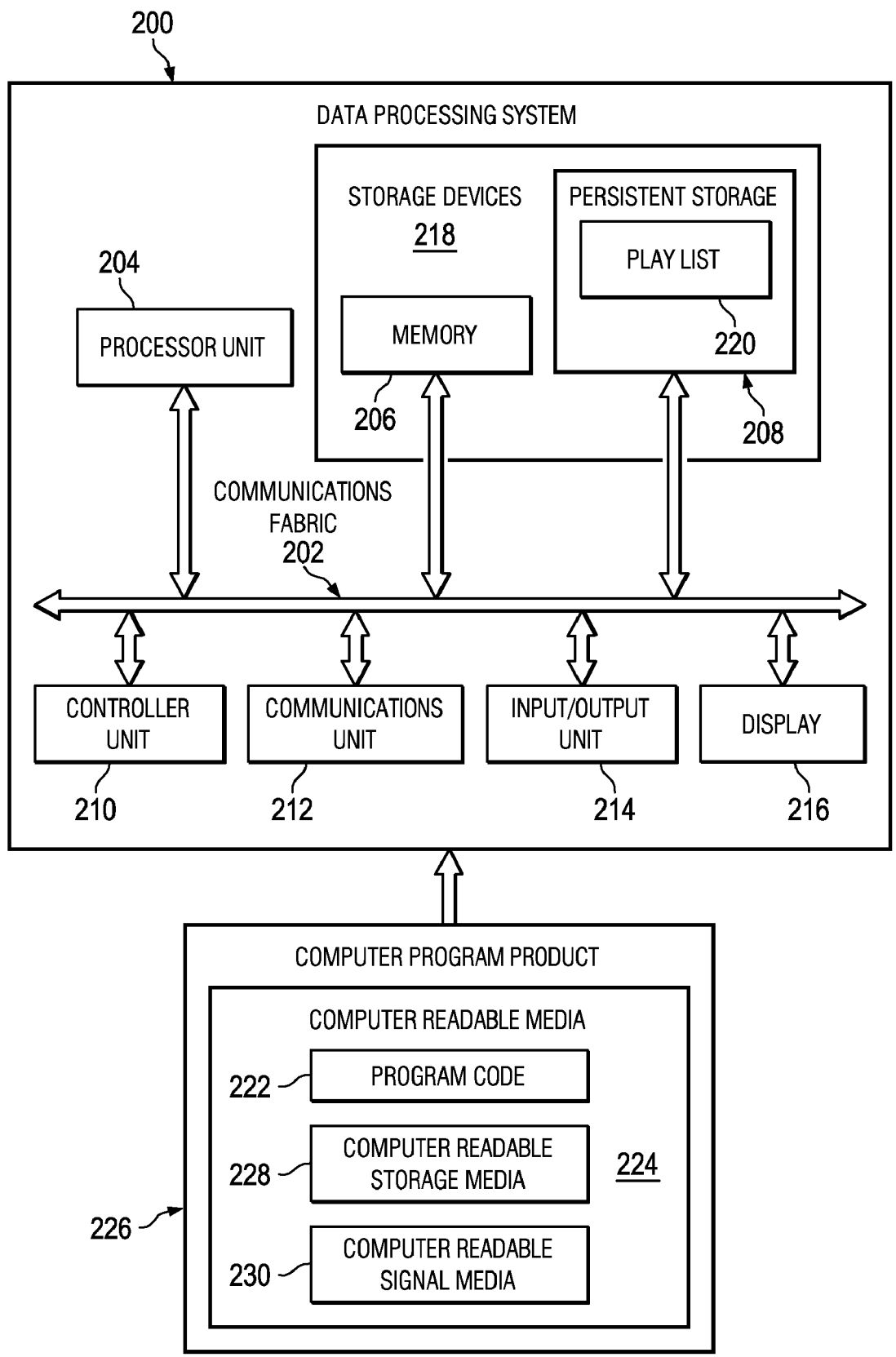
FIG. 2 is a diagram of a data processing system in which illustrative embodiments may be implemented.
Figure 3:
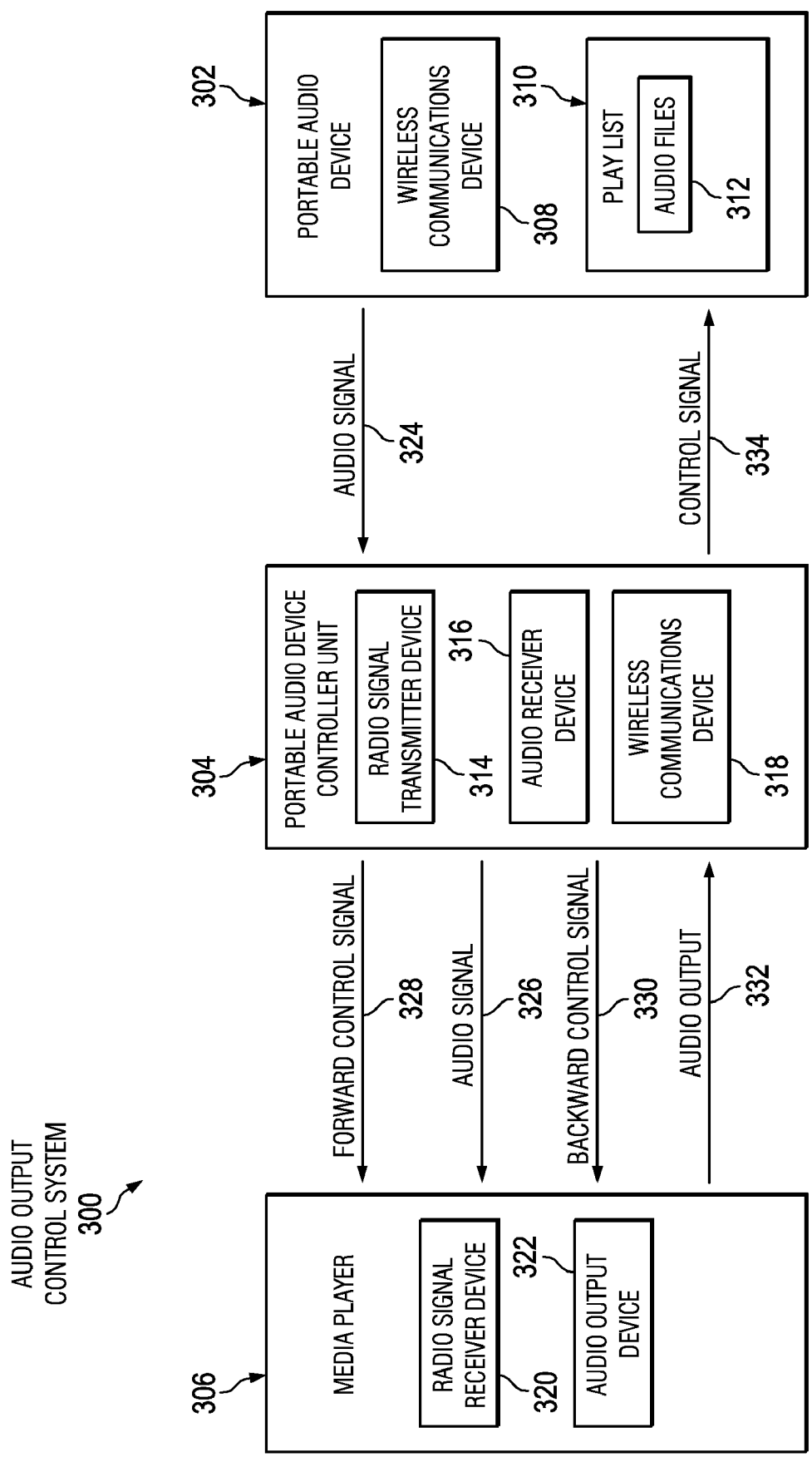
FIG. 3 is another diagram of a network of data processing systems in which illustrative embodiments may be implemented.

With reference now to the figures and in particular with reference to FIGS. 1-3, example diagrams of data processing environments are provided in which illustrative embodiments may be implemented. It should be appreciated that FIGS. 1-3 are only intended as examples and are not meant to assert or imply any limitation with regard to the environments in which different illustrative embodiments may be implemented. Many modifications to the depicted environments may be made.

FIG. 1 depicts a diagram of a network of data processing systems in which illustrative embodiments may be implemented. Audio output control system 100 is a network of data processing systems and other devices in which illustrative embodiments may be implemented. Audio output control system 100 includes portable audio device 102 and media player 104.

Portable audio device 102 is a hand held electronic device capable of storing and playing audio files containing songs, music, and/or spoken word content. Portable audio device 102 may, for example, be an MP3 player or an iPOD®. Portable audio device 102 includes controller device 106, radio signal transmitter device 108, audio receiver device 110, and play list 112. Controller device 106 is the component responsible for directing the functionality of illustrative embodiments within portable audio device 102 using radio frequency tuning. For example, controller device 106 directs portable audio device 102 to move forward or backward in play list 112 depending on the audible audio signal received by audio receiver device 110. In addition, controller device 106 directs radio signal transmitter device 108 to increment or decrement the radio frequency of each of the three different channels that the three different signals, such as audio signal 118, forward control signal 120, and backward control signal 122, are transmitted on by a predetermined amount based on the particular signal included in audio output 124 received by audio receiver device 110. In these examples, the predetermined amount may be about 0.2 MHz.

Radio signal transmitter device 108 may, for example, be an FM, AM, XM, or any other type of radio signal transmitter, which converts the audio files in play list 112 into radio frequency signals. Radio signal transmitter device 108 transmits these radio frequency signals of the audio files to media player 104 via audio signal 118. Radio signal transmitter device 108 is a radio frequency signal transmitter that transmits wireless signals to radio signal receivers that are capable of receiving the radio frequency signal transmission. The radio frequency signal transmission may be analog or digital.

Portable audio device 102 may include a control that allows a user to select the frequency on which radio signal transmitter device 108 transmits the radio frequency signals and a display screen for displaying the selected transmission frequency to the user. Alternatively, portable audio device 102 may use controller device 106 to automatically select the frequency for transmitting the radio signals or radio signal transmitter device 108 may use a predefined default radio frequency for data transmission. Audio receiver device 110 may, for example, be a microphone or other device capable of receiving audio output from an audio source.

Play list 112 is a list of audio files stored on portable audio device 102. Play list 112 may include a plurality of audio files, such as music recordings, song recordings, and/or speech recordings. In addition, each audio file may contain its own play list of one or more recordings.

Media player 104 may, for example, be a radio system, a television system, a stereo system, or a computer system. Media player 104 is capable of receiving radio frequency signals using radio signal receiver device 114 and audibly outputting audio output 124 using audio output device 116. Audio output device 116 may, for example, be one or more speakers or other devices capable of outputting sound in an audio output system.

Portable audio device 102 uses radio signal transmitter device 108 to transmit audio signal 118, forward control signal 120, and backward control signal 122 to media player 104. Audio signal 118 is the audio signal of the audio file in play list 112 currently being played on portable audio device 102. Radio signal transmitter device 108 transmits audio signal 118 on the middle radio frequency channel of the three different radio frequency channels transmitted to media player 104. Forward control signal 120 is a computer-generated radio signal that directs portable audio device 102 to advance to the next audio file in play list 112 when received by audio receiver device 110. Radio signal transmitter device 108 transmits forward control signal 120 on the upper radio frequency channel of the three different radio frequency channels. Backward control signal 122 is a computer-generated radio signal that directs portable audio device 102 to retreat to the previous audio file in play list 112 when received by audio receiver device 110. Radio signal transmitter device 108 transmits backward control signal 122 on the lower radio frequency channel of the three different radio frequency channels. The upper, middle, and lower radio frequency channels are separated by a predetermined amount, such as, for example, 0.2 MHz.

The user tunes radio signal receiver device 114 in media player 104 to the middle radio frequency channel, which radio signal transmitter device 108 is transmitting audio signal 118 on. Alternatively, portable audio device 102 may utilize controller device 106 to direct radio signal receiver device 114 to automatically tune to the radio frequency channel associated with audio signal 118 of the audio file currently being played on portable audio device 102. To skip ahead to the next audio file in play list 112, the user tunes radio signal receiver device 114 to the upper radio frequency channel, which is associated with forward control signal 120. Forward control signal 120 is outputted by media player 104 using audio output device 116 to produce audio output 124. Audio receiver device 110 on portable audio device 102 receives audio output 124, which in this example is the forward control signal.

After receiving the forward control signal in audio output 124, controller device 106 directs portable audio device 102 to advance to the next audio file in play list 112. In addition, controller device 106 directs radio signal transmitter device 108 to increment the radio frequency of each of the channels associated with audio signal 118, forward control signal 120, and backward control signal 122 by a predetermined amount, such as, for example, 0.2 MHz.

To skip back to the previous audio file in play list 112, the user tunes radio signal receiver device 114 to the lower radio frequency channel, which is associated with backward control signal 122. Backward control signal 122 is then outputted by media player 104 using audio output device 116 as audio output 124. Audio receiver device 110 on portable audio device 102 receives audio output 124, which in this example is the backward control signal.

After receiving the backward control signal in audio output 124, controller device 106 directs portable audio device 102 to retreat to the previous audio file in play list 112. In addition, controller device 106 directs radio signal transmitter device 108 to decrement the radio frequency of each of the channels associated with audio signal 118, forward control signal 120, and backward control signal 122 by the same predetermined amount, such as, for example, 0.2 MHz.

It should be noted that FIG. 1 is only intended as an example, and not as an architectural limitation for the different illustrative embodiments. For example, audio output control system 100 may also include servers, clients, and other devices not shown. Program code located in audio output control system 100 may be stored on a computer recordable storage medium and downloaded to a data processing system or other device for use. For example, program code may be stored on a computer recordable storage medium on a server and downloaded to portable audio device 102 over a wired or wireless communications network for use on portable audio device 102. In addition, audio files may be downloaded from a server or other data processing system, such as a personal computer, laptop computer, personal digital assistant (PDA), or cellular telephone, to portable audio device 102 over the communications network for use on portable audio device 102.

With reference now to FIG. 2, a diagram of a data processing system is depicted in which illustrative embodiments may be implemented. Data processing system 200 is an example of a portable audio device, such as portable audio device 102 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, controller unit 210, communications unit 212, input/output (I/O) unit 214, and display 216.

Processor unit 204 serves to execute instructions for software applications or programs that may be loaded into memory Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A storage device is any piece of hardware that is capable of storing information, such as, for example, without limitation, data, program code in functional form, and/or other suitable information either on a transient basis and/or a persistent basis. Memory 206, in these examples, may, for example, be a random access memory (RAM), or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Persistent storage 208 stores play list 220. Play list 220 may, for example, be play list 112 in FIG. 1. Persistent storage 208 may store play list 220 in a structured or an unstructured format. The data stored in play list 220 may, for example, include a plurality of audio files, such as music, songs, and/or spoken word content. In addition, the data stored in play list 220 may include information regarding the audio files, such as titles and descriptions of the audio files. Further, the data stored in play list 220 may include graphics or other images associated with the audio files.

Controller unit 210 is a component that controls certain functionality of data processing system 200. Controller unit 210 may, for example, be controller device 106 in FIG. 1. Controller unit 210 is comprised of hardware and software components. However, it should be noted that controller unit 210 may be comprised entirely of software components. In addition, even though controller unit 210 is illustrated as being located within data processing system 200, controller unit 210 may be located remotely as a stand alone device or as a component located within another data processing system, such as, for example, a radio, a cassette player, a compact disk player, a digital versatile disk player, or a smart phone, which may be wirelessly connected to data processing system 200. Controller unit 210 may, for example, direct data processing system 200 to move forward to the next audio file in play list 220 or move backward to the previous audio file in play list 220 depending on the audio output, such as audio output 124 in FIG. 1, received by data processing system 200 from a speaker system on a media player, such as audio output device 116 on media player 104 in FIG. 1. Moreover, controller unit 210 may direct communications unit 212 to increment or decrement the radio frequency of each of the different channels transmitted by data processing system 200.

Communications unit 212, in this example, provides for communication with other data processing systems or devices, such as radios, computers, televisions, and stereos, which are capable of receiving radio signals. Communications unit 212 is a device capable of transmitting a plurality of different signals on a plurality of different radio frequency channels. In addition, communications unit 212 may include other devices, such as a network interface card and/or a modem, for sending and receiving data over a wireless network, such as Internet. Further, communications unit 212 may provide communications through the use of physical communications links.

Input/output unit 214 allows for the input and output of data with other devices that may be connected to data processing system 200. For example, input/output unit 214 may provide a connection for user input through a keypad and/or some other suitable input device. Further, input/output unit 214 may include an audio receiver device, such as audio receiver device 110 in FIG. 1. The audio receiver device may, for example, be a microphone, which is capable of receiving the audible audio output from a media player's speaker system. Display 216 provides a mechanism to display information to a user, such as the title of the audio file currently being played by data processing system 200 or the radio frequency of the channel associated with the transmitted audio signal of the audio file currently being played.

Instructions for an operating system, applications, and/or programs may be located on storage devices 218, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 222 is located in a functional form on computer readable media 224 that is selectively removable and may be loaded onto or transferred to data processing system 200 for running by processor unit 204. Program code 222 and computer readable media 224 form computer program product 226. In one example, computer readable media 224 may be computer readable storage media 228 or computer readable signal media 230. Computer readable storage media 228 may, for example, include an optical or magnetic disc that is inserted or placed into a drive or other device that is part of persistent storage 208 for transfer onto a storage device, such as a hard drive, that is part of persistent storage 208. Computer readable storage media 228 also may take the form of a persistent storage, such as a hard drive, a thumb drive, or a flash memory that is connected to data processing system 200. In some instances, computer readable storage media 228 may not be removable from data processing system 200.

Alternatively, program code 222 may be transferred to data processing system 200 using computer readable signal media 230. Computer readable signal media 230 may, for example, be a propagated data signal containing program code 222. For example, computer readable signal media 230 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communication link and/or the connection may be physical or wireless in the illustrative examples. The computer readable media also may take the form of non-tangible media, such as communication links or wireless transmissions containing the program code.

In some illustrative embodiments, program code 222 may be downloaded over a network to persistent storage 208 from another device or data processing system through computer readable signal media 230 for use within data processing system 200. For instance, program code stored in a computer readable storage media in a server data processing system may be downloaded over a network from the server to data processing system 200. The data processing system providing program code 222 may be a server computer, a client computer, or some other device capable of storing and transmitting program code 222.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 may be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 224 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may, for example, be memory 206 or a cache such as found in an interface and memory controller hub that may be present in communications fabric 202.

With reference now to FIG. 3, another diagram of a network of data processing systems is depicted in which illustrative embodiments may be implemented. Audio output control system 300 is a network of data processing systems and other devices in which illustrative embodiments may be implemented. Audio output control system 300 includes portable audio device 302, portable audio device controller unit 304, and media player 306.

Portable audio device 302 implements a portion of the functionality of portable audio device 102 in FIG. 1. Portable audio device 302 includes wireless communications device 308 and play list 310. Wireless communications device 308 is a device that includes wireless network technology, such as, for example, Bluetooth, wireless fidelity (WiFi), infrared, ultra-wide band (UWB), or ZigBee, which is used to send data to and receive data from other devices, such as portable audio device controller unit 304. For example, portable audio device 302 utilizes wireless communications device 308 to send data, such as audio signal 324, to portable audio device controller unit 304. In addition, portable audio device 302 utilizes wireless communications device 308 to receive data, such as control signal 334, from portable audio device controller unit 304.

Play list 310 serves a similar function as play list 112 in FIG. 1. Play list 310 includes audio files 312. Audio files 312 represent a plurality of audio files containing any type of audio content.

Portable audio device controller unit 304 implements other portions of the functionality of portable audio device 102 in FIG. 1. Portable audio device controller unit 304 is a stand alone device in this example. However, portable audio device controller unit 304 may be located in another data processing system, such as a cellular telephone, or in media player 306. Portable audio device controller unit 304 includes radio signal transmitter device 314, audio receiver device 316, and wireless communications device 318.

Radio signal transmitter device 314 provides similar functionality as radio signal transmitter device 108 in FIG. 1. Radio signal transmitter device 314 transmits three different signals, such as audio signal 326, forward control signal 328, and backward control signal 330, on three different radio frequency channels to media player 306.

Media player 306 is similar to media player 104 in FIG. 1. Media player 306 includes radio signal receiver device 320 and audio output device 322, such as radio signal receiver device 114 and audio output device 116 in FIG. 1. Media player 306 uses radio signal receiver device 320 to receive audio signal 326, forward control signal 328, and backward control signal 330 on the three respective radio frequency channels associated with the different signals from portable audio device controller unit 304. Media player 306 uses audio output device 322 to audibly output the signal transmitted over the radio frequency channel that media player 306 is currently tuned to. The audible output of audio output device 322 is audio output 332. Audio output 332 is similar to audio output 124 in FIG. 1.

Portable audio device controller unit 304 uses audio receiver device 316 to receive audio output 332. Audio receiver device 316 provides similar functionality as audio receiver device 110 in FIG. 1. In addition, portable audio device controller unit 304 uses wireless communications device 318 to wirelessly send control signal 334 to portable audio device 302. Wireless communications device 318 in portable audio device controller unit 304 uses wireless network technology that is similar to the wireless network technology utilized by wireless communications device 308 in portable audio device 302.

Control signal 334 includes either a forward control signal or a backward control signal depending on which of the two control signals is included in audio output 332. Control signal 334 directs portable audio device 302 to either play the next audio file in play list 310 or play the previous audio file in play list 310 based on whether control signal 334 includes a forward control signal or a backward control signal. Further, audio output 332 directs radio signal transmitter device 314 to either increment or decrement the frequency of each of the radio frequency channels over which audio signal 326, forward control signal 328, and backward control signal 330 are transmitted based on whether audio output 332 includes a forward control signal or a backward control signal.

Figure 4A:
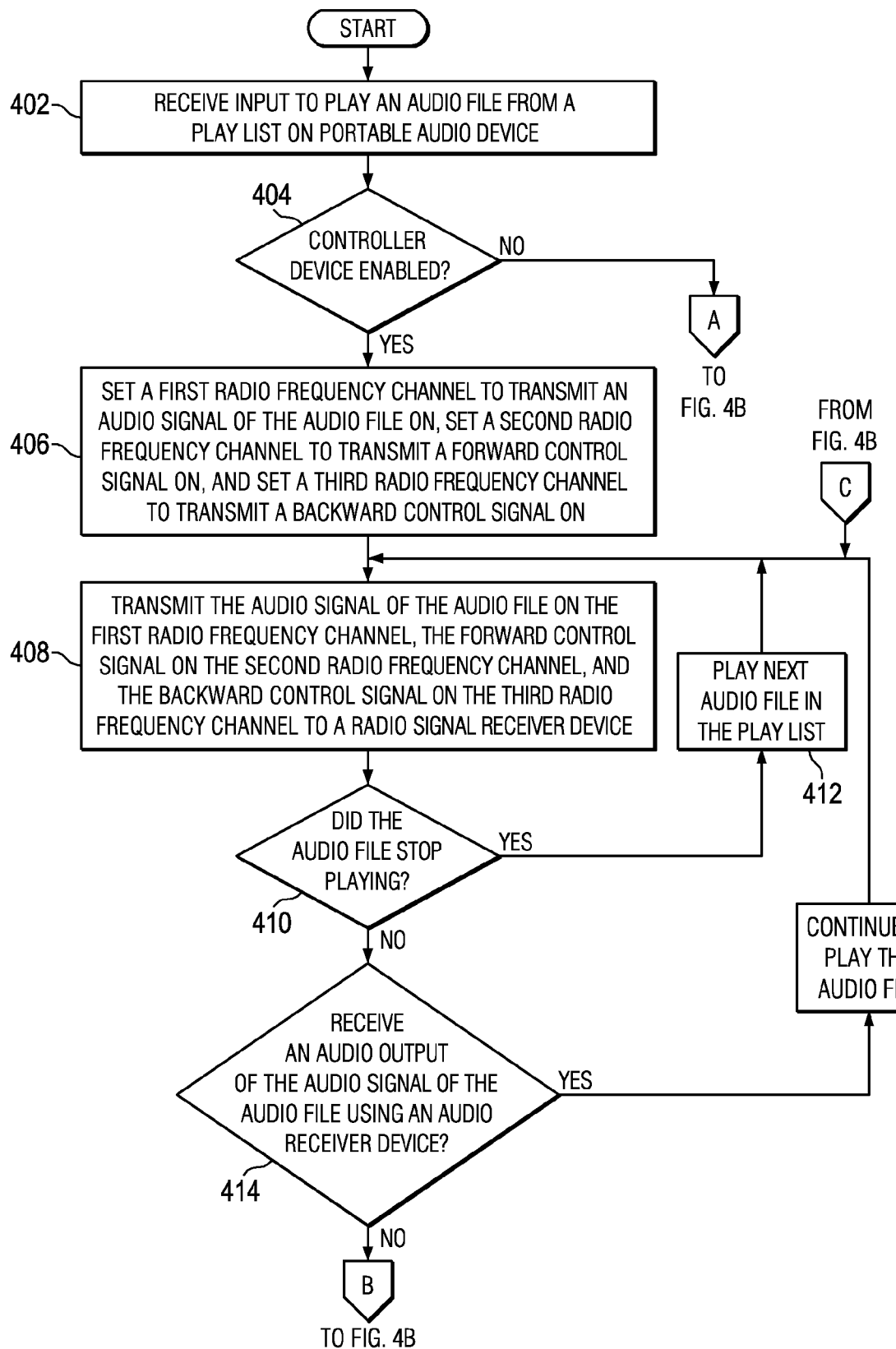
FIG. 4A and FIG. 4B is a flowchart illustrating a process for a portable audio device that includes a controller in accordance with an illustrative embodiment.
Figure 4B:
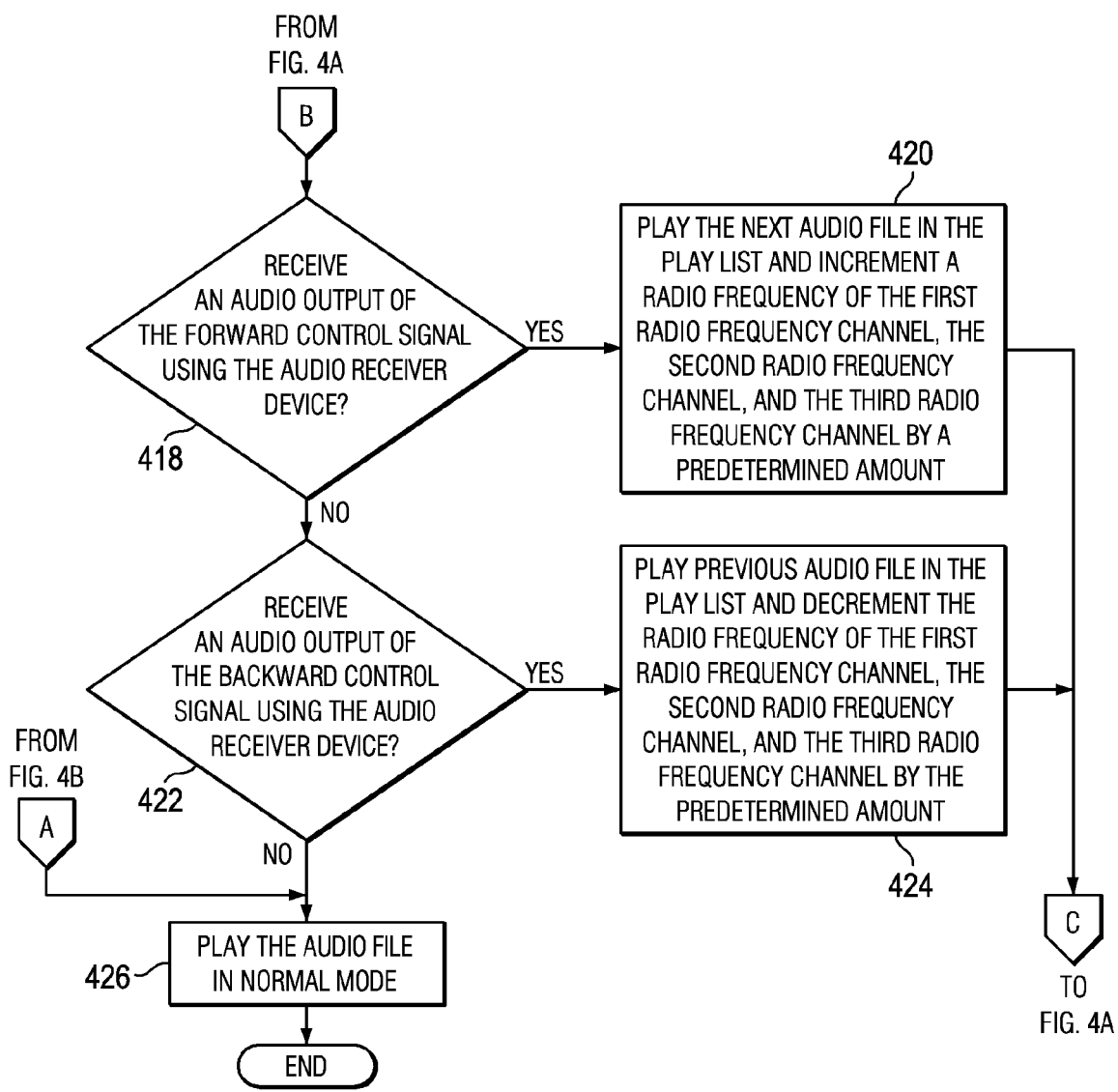

With reference now to FIG. 4A and FIG. 4B, a flowchart illustrating a process for a portable audio device that includes a controller is shown in accordance with an illustrative embodiment. The process shown in FIGS. 4A and 4B may be implemented in a portable audio device, such as portable audio device 102 in FIG. 1.

The process begins when the portable audio device receives an input to play an audio file from a play list, such as play list 112 in FIG. 1, on the portable audio device (step 402). After receiving the input to play the audio file in step 402, the portable audio device makes a determination as to whether a controller device, such as controller device 106 in FIG. 1, is enabled (step 404). If the controller device is not enabled, no output of step 404, then the process proceeds to step 426 where the portable audio device plays the audio file in a normal mode of operation.

If the controller device is enabled, yes output of step 404, then the controller device sets a first radio frequency channel to transmit an audio signal of the audio file on, sets a second radio frequency channel to transmit a forward control signal on, and sets a third radio frequency channel to transmit a backward control signal on (step 406). Afterward, the controller device directs a radio signal transmitter device, such as radio signal transmitter device 108 in FIG. 1, to transmit the audio signal of the audio file on the first radio frequency channel, the forward control signal on the second radio frequency channel, and the backward control signal on the third radio frequency channel to a radio signal receiver device located in a media player, such as radio signal receiver 114 located in media player 104 in FIG. 1 (step 408). Then, the controller device makes a determination as to whether the audio file stops playing (step 410).

If the controller device determines that the audio file did stop playing, yes output of step 410, then the controller device directs the portable audio device to play the next audio file in the play list (step 412). Thereafter, the process returns to step 408. If the controller device determines that the audio file did not stop playing, no output of step 410, then the controller device makes a determination as to whether the portable audio device receives an audio output of the audio signal of the audio file using an audio receiver device, such as audio receiver device 110 in FIG. 1 (step 414).

If the controller device determines that the portable audio device did receive the audio output of the audio signal of the audio file using the audio receiver device, yes output of step 414, then the controller device directs the portable audio device to continue to play the audio file (step 416). Thereafter, the process returns to step 408. If the controller device determines that the portable audio device did not receive the audio output of the audio signal of the audio file using the audio receiver device, no output of step 414, then the controller device makes a determination as to whether the portable audio device receives an audio output of the forward control signal using the audio receiver device (step 418).

If the controller device determines that the portable audio device did receive an audio output of the forward control signal using the audio receiver device, yes output of step 418, then the controller device directs the portable audio device to play the next audio file in the play list and directs the radio signal transmitter device to increment a radio frequency of the first radio frequency channel, the second radio frequency channel, and the third radio frequency channel by a predetermined amount (step 420). Thereafter, the process returns to step 408. If the controller device determines that the portable audio device did not receive an audio output of the forward control signal using the audio receiver device, no output of step 418, then the controller device makes a determination as to whether the portable audio device receives an audio output of the backward control signal using the audio receiver device (step 422).

If the controller device determines that the portable audio device did receive an audio output of the backward control signal using the audio receiver device, yes output of step 422, then the controller unit directs the portable audio device to play the previous audio file in the play list and directs the radio signal transmitter to decrement the radio frequency of the first radio frequency channel, the second radio frequency channel, and the third radio frequency channel by the predetermined amount (step 424). Thereafter, the process returns to step 408. If the controller device determines that the portable audio device did not receive an audio output of the backward control signal using the audio receiver device, no output of step 422, then the controller unit directs the portable audio device to play the audio file in a normal mode of operation (step 426). The process terminates thereafter.

Figure 5:
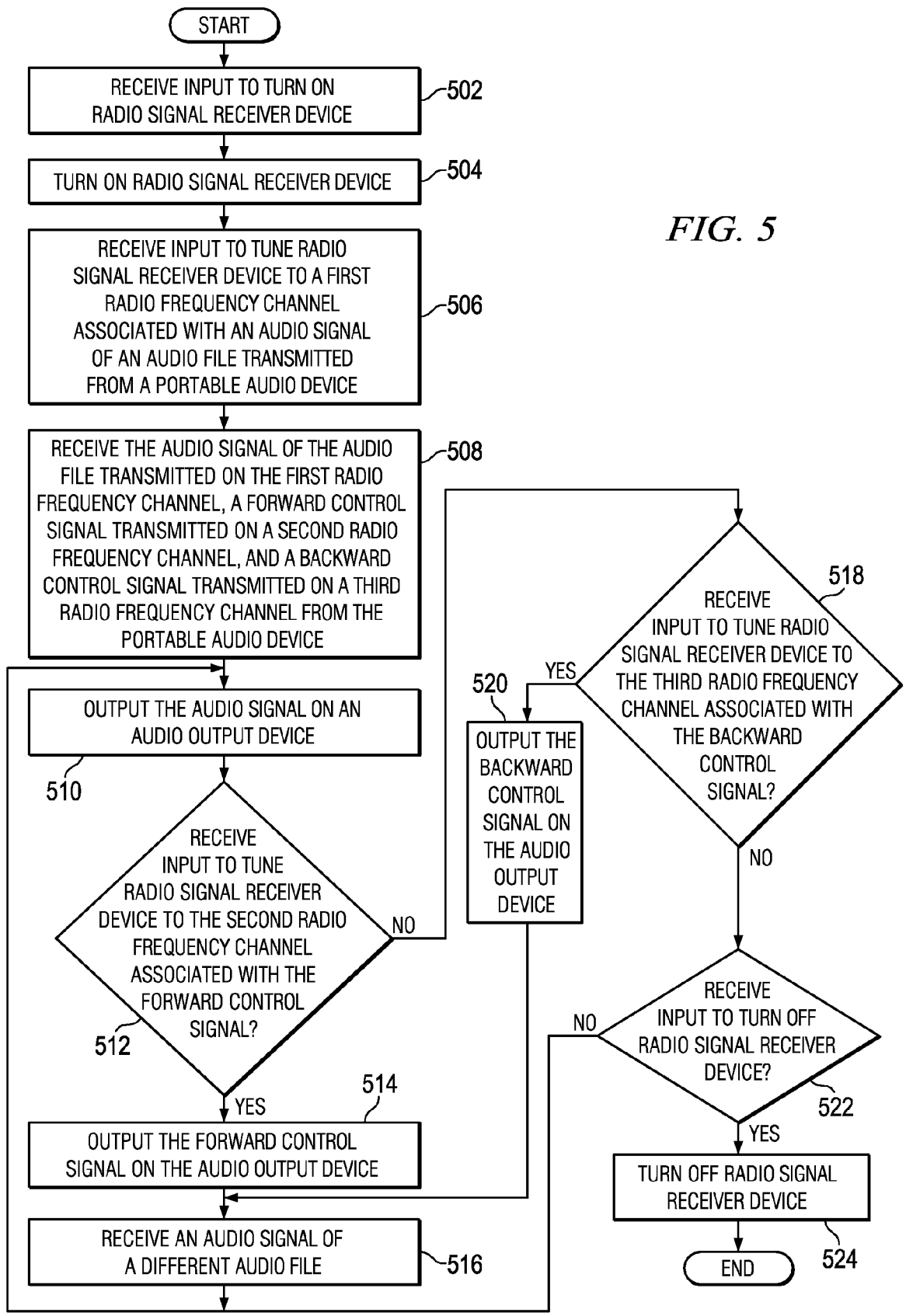
FIG. 5 is a flowchart illustrating a process for a media player communicatively coupled to a portable audio device in accordance with an illustrative embodiment.

With reference now to FIG. 5, a flowchart illustrating a process for a media player communicatively coupled to a portable audio device is shown in accordance with an illustrative embodiment. The process shown in FIG. 5 may be implemented in a media player, such as media player 104 in FIG. 1.

The process begins when the media player receives an input to turn on a radio signal receiver device, such as radio signal receiver device 114 in FIG. 1 (step 502). After receiving the input in step 502, the media player turns on the radio signal receiver device (step 504). In addition, the media player receives an input to tune the radio signal receiver device to a first radio frequency channel associated with an audio signal of an audio file, such as audio signal 118 in FIG. 1, transmitted from a portable audio device, such as portable audio device 102 in FIG. 1 (step 506).

Subsequently, the radio signal receiver device receives the audio signal of the audio file transmitted on the first radio frequency channel, a forward control signal transmitted on a second radio frequency channel, and a backward control signal transmitted on a third radio frequency channel from the portable audio device (step 508). Then, the media player outputs the audio signal on an audio output device, such as audio output device 116 in FIG. 1 (step 510). Afterward, the media player makes a determination as to whether the media player receives an input to tune the radio signal receiver device to the second radio frequency channel associated with the forward control signal (step 512).

If the media player determines that the media player did receive an input to tune the radio signal receiver device to the second radio frequency channel associated with the forward control signal, yes output of step 512, then the media player outputs the forward control signal on the audio output device (step 514). Subsequently, the media player receives an audio signal of a different audio file (step 516). Thereafter, the process returns to step 510.

If the media player determines that the media player did not receive an input to tune the radio signal receiver device to the second radio frequency channel associated with the forward control signal, no output of step 512, then the media player makes a determination as to whether the media player receives an input to tune radio signal receiver device to the third radio frequency channel associated with the backward control signal (step 518). If the media player determines that the media player did receive an input to tune radio signal receiver device to the third radio frequency channel associated with the backward control signal, yes output of step 518, then the media player outputs the backward control signal on the audio output device (step 520). Thereafter, the process returns to step 516. If the media player determines that the media player did not receive an input to tune radio signal receiver device to the third radio frequency channel associated with the backward control signal, no output of step 518, then the media player makes a determination as to whether the media player receives an input to turn off the radio signal receiver device (step 522).

If the media player determines that the media player did not receive an input to turn off the radio signal receiver device, no output of step 522, then the process returns to step 510. If the media player determines that the media player did receive an input to turn off the radio signal receiver device, yes output of step 522, then the media player turns off the radio signal receiver device (step 524). The process terminates thereafter.

Figure 6:
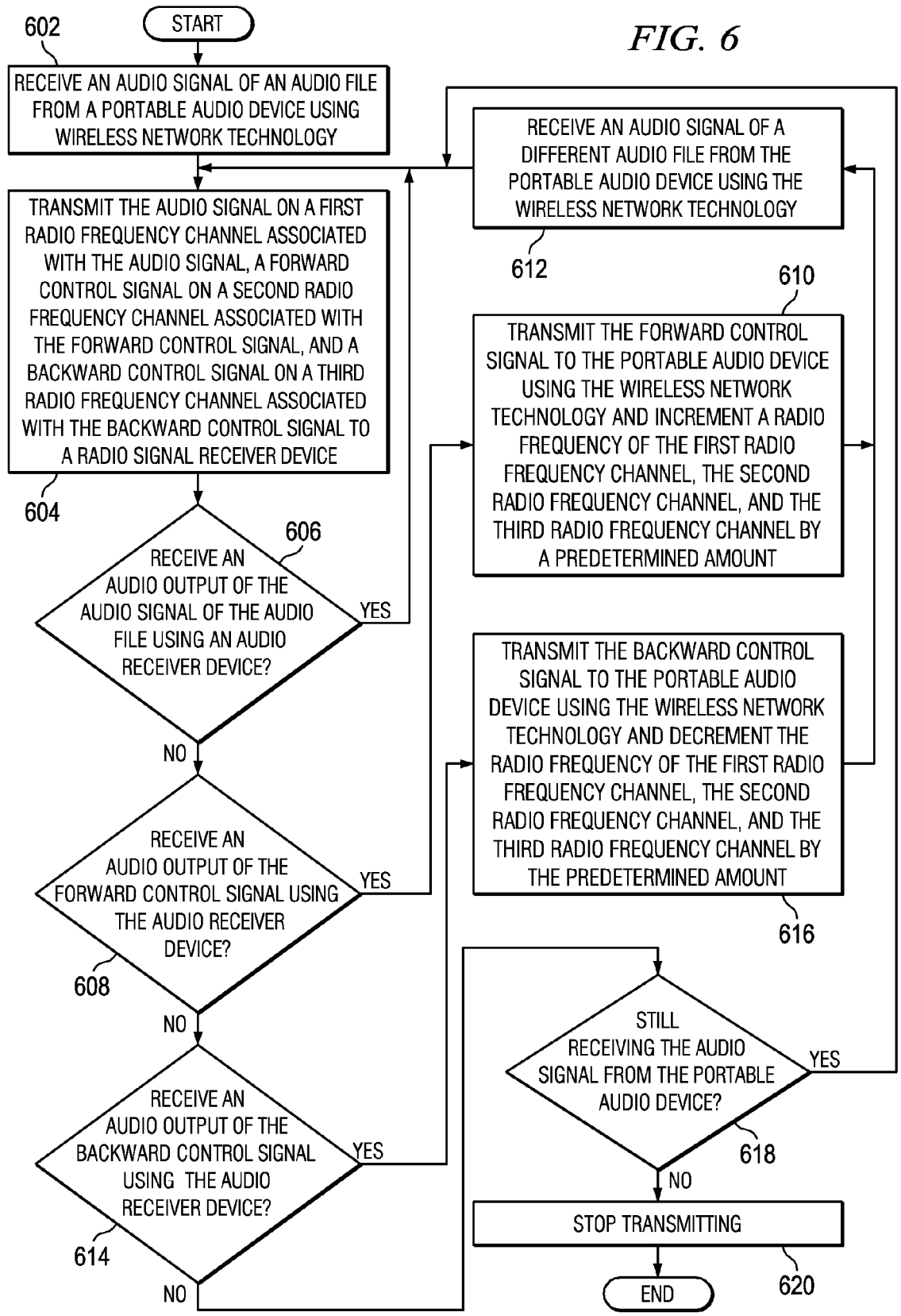
FIG. 6 is a flowchart illustrating a process for a portable audio device controller wirelessly connected to a portable audio device in accordance with an illustrative embodiment.

With reference now to FIG. 6, a flowchart illustrating a process for a portable audio device controller wirelessly connected to a portable audio device is shown in accordance with an illustrative embodiment. The process shown in FIG. 6 may be implemented in a portable audio device controller, such as portable audio device controller unit 304 in FIG. 3.

The process begins when the portable audio device controller uses a wireless communications device, such as wireless communications device 318 in FIG. 3, to receive an audio signal of an audio file, such as audio signal 324 in FIG. 3, from a portable audio device, such as portable audio device 302 in FIG. 3, using wireless network technology, such as Bluetooth technology (step 602). After receiving the audio signal in step 602, the portable audio device controller uses a radio signal transmitter device, such as radio signal transmitter device 314 in FIG. 3, to transmit the audio signal on a first radio frequency channel associated with the audio signal, a forward control signal on a second radio frequency channel associated with the forward control signal, and a backward control signal on a third radio frequency channel associated with the backward control signal to a radio signal receiver device on a media player, such as radio signal receiver device 320 on media player 306 in FIG. 3 (step 604). Then, the portable audio device controller makes a determination as to whether the portable audio device controller receives an audio output of the audio signal of the audio file using an audio receiver device, such as audio receiver device 316 in FIG. 3 (step 606).

If the portable audio device controller determines that the portable audio device controller did receive an audio output of the audio signal of the audio file using the audio receiver device, yes output of step 606, then the process returns to step 604. If the portable audio device controller determines that the portable audio device controller did not receive an audio output of the audio signal of the audio file using the audio receiver device, no output of step 606, then the portable audio device controller makes a determination as to whether the portable audio device controller receives an audio output of the forward control signal using the audio receiver device (step 608). If the portable audio device controller determines that the portable audio device controller did receive an audio output of the forward control signal using the audio receiver device, yes output of step 608, then the portable audio device controller uses the wireless communications device to transmit the forward control signal to the portable audio device using the wireless network technology and directs the radio signal transmitter device to increment a radio frequency of the first radio frequency channel, the second radio frequency channel, and the third radio frequency channel by a predetermined amount, such as 0.2 MHz (step 610).

Subsequently, the portable audio device controller uses the wireless communications device to receive an audio signal of a different audio file from the portable audio device using the wireless network technology (step 612). If the portable audio device controller determines that the portable audio device controller did not receive an audio output of the forward control signal using the audio receiver device, no output of step 608, then the portable audio device controller makes a determination as to whether the portable audio device controller receives an audio output of the backward control signal using the audio receiver device (step 614). If the portable audio device controller determines that the portable audio device controller did receive an audio output of the backward control signal using the audio receiver device, yes output of step 614, then the portable audio device controller uses the wireless communications device to transmit the backward control signal to the portable audio device using the wireless network technology and directs the radio signal transmitter device to decrement the radio frequency of the first radio frequency channel, the second radio frequency channel, and the third radio frequency channel by the predetermined amount (step 616). Thereafter, the process returns to step 612.

If the portable audio device controller determines that the portable audio device controller did not receive an audio output of the backward control signal using the audio receiver device, no output of step 614, then the portable audio device controller makes a determination as to whether audio receiver device is still receiving the audio signal from the portable audio device (step 618). If the portable audio device controller determines that the audio receiver device is still receiving the audio signal from the portable audio device, yes output of step 618, then the process returns to step 604. If the portable audio device controller determines that the audio receiver device is not still receiving the audio signal from the portable audio device, no output of step 618, then the portable audio device controller directs the radio signal transmitter device to stop transmitting (step 620). The process terminates thereafter.

Figure 7:
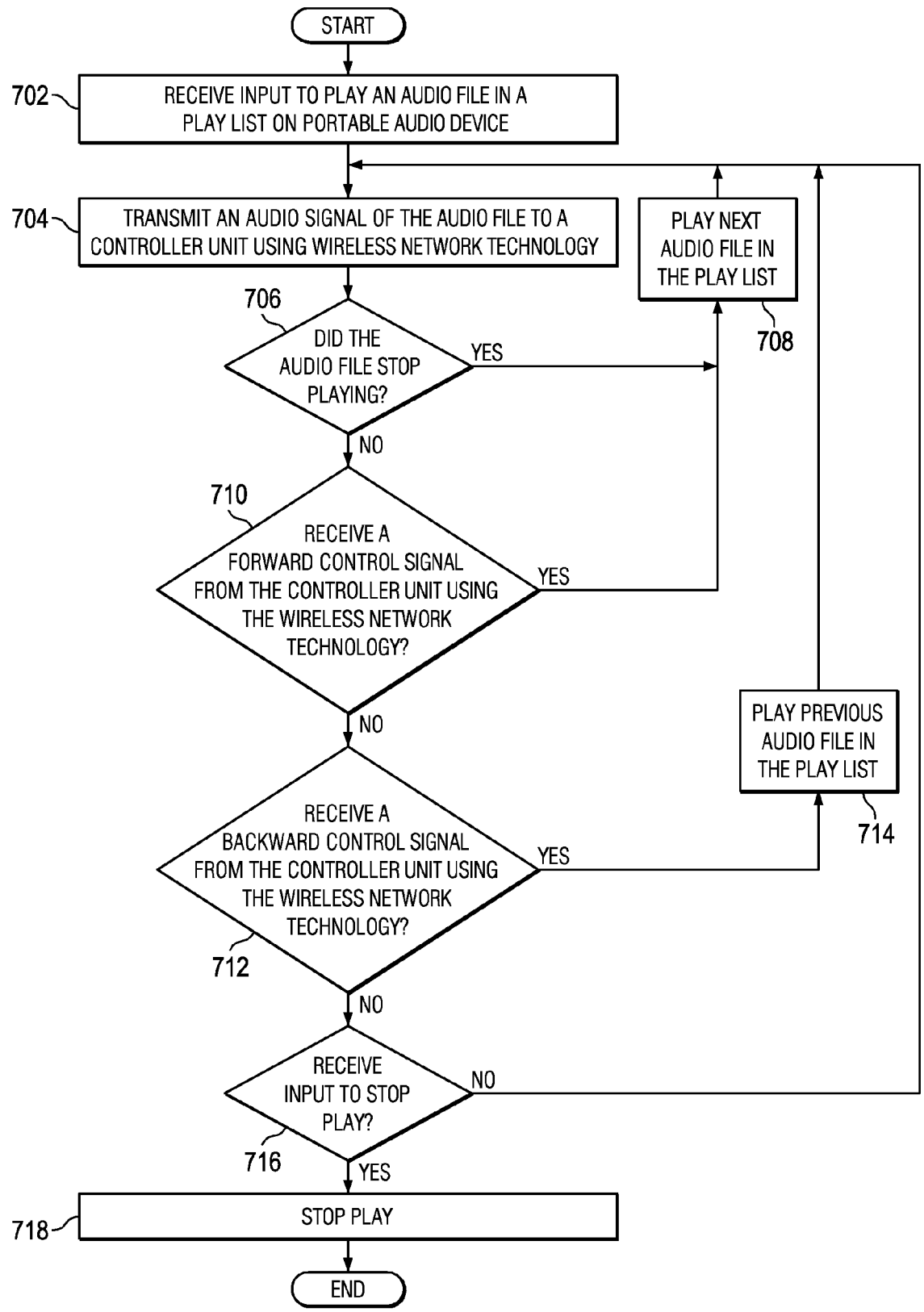
FIG. 7 is a flowchart illustrating a process for a portable audio device wirelessly connected to a portable audio device controller in accordance with an illustrative embodiment.

With reference now to FIG. 7, a flowchart illustrating a process for a portable audio device wirelessly connected to a portable audio device controller is shown in accordance with an illustrative embodiment. The process shown in FIG. 7 may be implemented in a portable audio device, such as portable audio device 302 in FIG. 3.

The process begins when the portable audio device receives an input to play an audio file in a play list, such as one of audio files 312 in play list 310 in FIG. 3, on the portable audio device (step 702). Then, the portable audio device uses a wireless communications device, such as wireless communications device 308 in FIG. 3, to transmit an audio signal, such as audio signal 324 in FIG. 3, of the audio file to a controller unit, such as portable audio device controller unit 304 in FIG. 3, using wireless network technology, such as Bluetooth technology (step 704). Afterward, the portable audio device makes a determination as to whether the audio file stops playing (step 706).

If the portable audio device determines that the audio file did stop playing, yes output of step 706, then the portable audio device plays the next audio file in the play list (step 708). Thereafter, the process returns to step 704. If the portable audio device determines that the audio file did not stop playing, no output of step 706, then the portable audio device makes a determination as to whether the wireless communications device receives a forward control signal from the controller unit using the wireless network technology (step 710).

If the portable audio device determines that the wireless communications device did receive a forward control signal from the controller unit using the wireless network technology, yes output of step 710, then the process returns to step 708. If the portable audio device determines that the wireless communications device did not receive a forward control signal from the controller unit using the wireless network technology, no output of step 710, then the portable audio device makes a determination as to whether the wireless communications device receives a backward control signal from the controller unit using the wireless network technology (step 712).

If the portable audio device determines that the wireless communications device did receive a backward control signal from the controller unit using the wireless network technology, yes output of step 712, then the portable audio device plays the previous audio file in the play list (step 714). Thereafter, the process returns to step 704. If the portable audio device determines that the wireless communications device did not receive a backward control signal from the controller unit using the wireless network technology, no output of step 712, then the portable audio device makes a determination as to whether the portable audio device receives an input to stop play (step 716).

If the portable audio device determines that the portable audio device did not receive an input to stop play, no output of step 716, then the process returns to step 704. If the portable audio device determines that the portable audio device did receive an input to stop play, yes output of step 716, then the portable audio device stops play (step 718). The process terminates thereafter.

Thus, illustrative embodiments of the present invention provide a computer implemented method, apparatus, and computer program product for controlling a portable audio device using radio frequency tuning. Illustrative embodiments allow a user of the portable audio device to utilize the functionality of a radio or other type of media player to control particular functions of the portable audio device for increased safety and ease of control while performing other tasks, such as driving a vehicle. In other words, illustrative embodiments allow a user to change the audio file being played by the portable audio device by using the functionality of the radio or media player to decrease the amount of the user's attention required to perform such as task.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for controlling a portable audio device using radio frequency tuning, the computer implemented method comprising:
    transmitting, by a radio signal transmitter device communicatively coupled to the portable audio device, an audio signal of an audio file on a first radio frequency channel, a forward control signal on a second radio frequency channel, and a backward control signal on a third radio frequency channel to a radio signal receiver device;
    determining whether an audio output of the forward control signal is received by the portable audio device using an audio receiver device; and
    responsive to a determination that the portable audio device did receive the audio output of the forward control signal using the audio receiver device, playing, by the portable audio device, a next audio file in a play list.

2. The computer implemented method of claim 1 further comprising:
    responsive to the determination that the portable audio device did receive the audio output of the forward control signal using the audio receiver device, incrementing, by the portable audio device, a radio frequency of the first radio frequency channel, the second radio frequency channel, and the third radio frequency channel by a predetermined amount.

3. The computer implemented method of claim 2, wherein the predetermined amount is 0.2 MHz.

4. The computer implemented method of claim 1 further comprising:
    determining whether an audio output of the backward control signal is received by the portable audio device using the audio receiver device; and
    responsive to a determination that the portable audio device did receive the audio output of the backward control signal using the audio receiver device, playing, by the portable audio device, a previous audio file in the play list.

5. The computer implemented method of claim 4 further comprising:
    responsive to the determination that the portable audio device did receive the audio output of the backward control signal using the audio receiver device, decrementing, by the portable audio device, a radio frequency of the first radio frequency channel, the second radio frequency channel, and the third radio frequency channel by a predetermined amount.

6. The computer implemented method of claim 1, wherein the first radio frequency channel, the second radio frequency channel, and the third radio frequency channel are located within a narrow band of radio frequencies.

7. The computer implemented method of claim 1, wherein the second radio frequency channel is set at 0.2 MHz above a radio frequency of the first radio frequency channel, and wherein the third radio frequency channel is set at 0.2 MHz below the radio frequency of the first radio frequency channel.

8. The computer implemented method of claim 1, wherein the portable audio player is an electronic device that stores and plays audio files.

9. The computer implemented method of claim 1, wherein the audio file is one of a plurality of audio files in the play list that include at least one of song recordings, music recordings, and speech recordings.

10. The computer implemented method of claim 1, wherein the radio signal receiver device is located in a media player, and wherein the media player is one of a radio system, a television system, a stereo system, or a computer system.

11. The computer implemented method of claim 1, wherein the radio signal transmitter device is located in the portable audio device.

12. The computer implemented method of claim 1, wherein the radio signal transmitter device is located in a portable audio device controller unit that is separate from the portable audio device.

13. The computer implemented method of claim 12, wherein the portable audio device includes a wireless communications device for sending data to and receiving data from the portable audio device controller unit using wireless network technology.

14. The computer implemented method of claim 1, wherein the forward control signal and the backward control signal are signals generated by the portable audio device.

15. The computer implemented method of claim 1, wherein a user tunes the radio signal receiver device to the first radio frequency associated with the audio signal of the audio file to listen to a content of the audio file, and wherein the user tunes the radio signal receiver device to the second radio frequency channel associated with the forward control signal to skip ahead to the next audio file in the play list, and wherein the user tunes the radio signal receiver device to the third radio frequency channel associated with the backward control signal to skip back to a previous audio file in the play list.

16. A data processing system for controlling a portable audio device using radio frequency tuning, the data processing system comprising:
    a bus system;
    a storage device connected to the bus system, wherein the storage device includes a set of instructions; and
    a processing unit connected to the bus system, wherein the processing unit executes the set of instructions to transmit an audio signal of an audio file on a first radio frequency channel, a forward control signal on a second radio frequency channel, and a backward control signal on a third radio frequency channel to a radio signal receiver device; determine whether an audio output of the forward control signal is received by an audio receiver device; and play a next audio file in a play list in response to a determination that the audio receiver device did receive the audio output of the forward control signal.

17. A computer program product including a computer readable storage medium having computer usable program code embodied thereon for controlling a portable audio device using radio frequency tuning, the computer program product comprising:

computer usable program code configured to transmit an audio signal of an audio file on a first radio frequency channel, a forward control signal on a second radio frequency channel, and a backward control signal on a third radio frequency channel to a radio signal receiver device;

computer usable program code configured to determine whether an audio output of the forward control signal is received by an audio receiver device; and computer usable program code configured to play a next audio file in a play list in response to a determination that the audio receiver device did receive the audio output of the forward control signal.

18. The computer program product of claim 17 further comprising:

computer usable program code configured to increment a radio frequency of the first radio frequency channel, the second radio frequency channel, and the third radio frequency channel by a predetermined amount in response to the determination that the audio receiver device did receive the audio output of the forward control signal.

19. The computer program product of claim 17 further comprising:

computer usable program code configured to determine whether an audio output of the backward control signal is received by the audio receiver device; and computer usable program code configured to play a previous audio file in the play list in response to a determination that the audio receiver device did receive the audio output of the backward control signal.

20. The computer program product of claim 19 further comprising:

computer usable program code configured to decrement a radio frequency of the first radio frequency channel, the second radio frequency channel, and the third radio frequency channel by a predetermined amount in response to the determination that the audio receiver device did receive the audio output of the backward control signal.

* * * * *